Figures 1, 2:
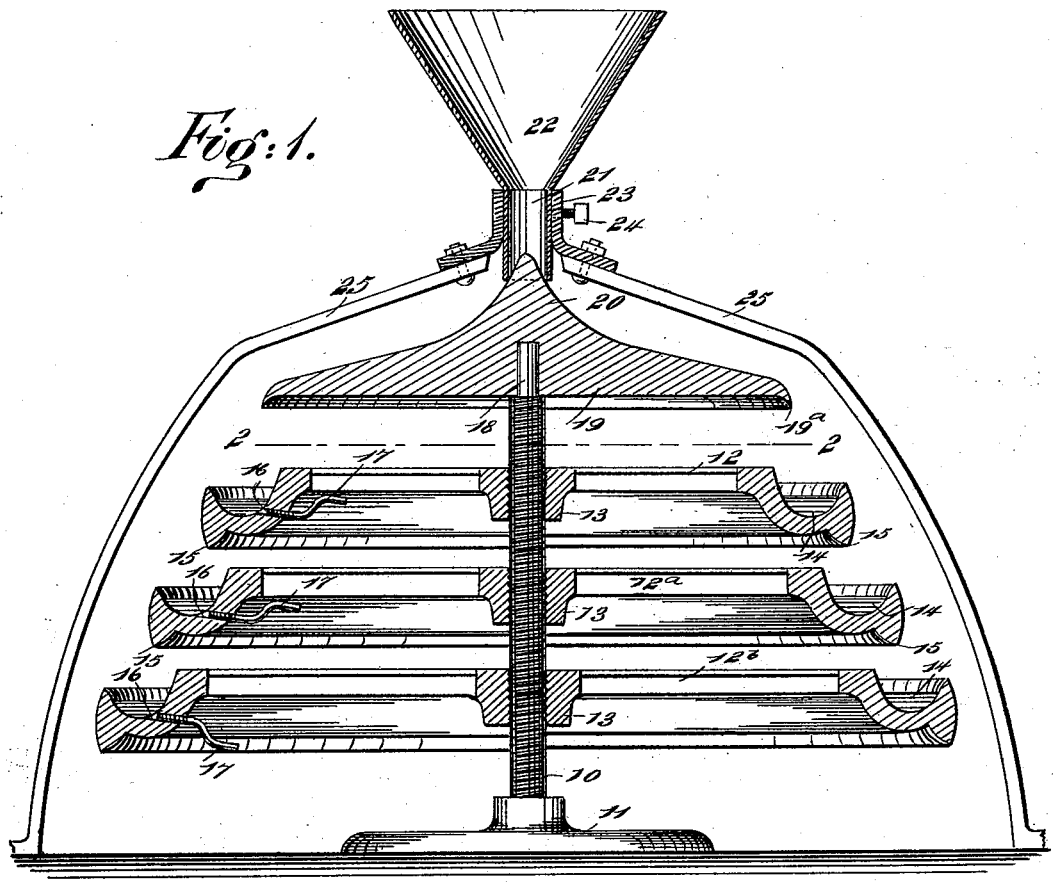

(No Model.)

F. L. FISHER.
SEPARATOR AND AMALGAMATOR.

No. 549,668. Patented Nov. 12, 1895.

WITNESSES:
Chas. O. Nider.
W. P. Hutchinson

INVENTOR
F. L. Fisher
BY
Munn & Co
ATTORNEYS.

UNITED STATES PATENT OFFICE.

FRANK L. FISHER, OF GRANGER, OREGON.

SEPARATOR AND AMALGAMATOR.

SPECIFICATION forming part of Letters Patent No. 549,668, dated November 12, 1895.

Application filed November 6, 1894. Serial No. 528,044. (No model.)

*To all whom it may concern:*

Be it known that I, FRANK L. FISHER, of Granger, in the county of Benton and State of Oregon, have invented a new and Improved Separator and Amalgamator, of which the following is a full, clear, and exact description.

My invention relates to improvements in that class of devices which are used for saving gold by separating it from its containing sand or other material and amalgamating it with quicksilver; and the object of my invention is to produce a very cheap and simple apparatus which can be used without power, which has a series of mercury-troughs delivering from one into the other, which has these troughs arranged so that they may be easily adjusted with relation to each other and so that the sand and waste material flows readily off from them, while the gold is caught and amalgamated, and also to produce a very simple means for regulating the feed and spreading the gold-containing material, so that it will be delivered suently to the upper of the amalgamating-troughs.

To these ends my invention consists of certain features of construction and combinations of parts, which will be hereinafter described and claimed.

Reference is to be had to the accompanying drawings, forming a part of this specification, in which similar figures of reference indicate corresponding parts in both the views.

Figure 1 is a central vertical section of the apparatus embodying my invention; and Fig. 2 is a sectional plan on the line 2 2 of Fig. 1, showing the upper wheel and mercury-trough only.

The apparatus is provided with a central base 11, which supports a screw-standard 10, and on this are mounted the wheels 12, $12^a$, and $12^b$, which are placed one above another and which have hubs 13 threaded to fit the standard, so that by simply turning them the wheels may be vertically adjusted and held the necessary distance apart. Each wheel has at its periphery a mercury-trough 14, and the wheels, reckoning from the top down, are of progressively-increasing diameters, so that the overflow from the upper trough drops to the next trough and from this to the next. I have shown three of these wheels and troughs; but it will of course be understood that any desired number may be arranged in series. The outer edges of the troughs are lower than the inner edges, as shown clearly in Fig. 1, and the wheels 12 are brought to an edge at their periphery and on the under side, as shown at 15, this edge being above the center of the trough beneath, and the overflow from the upper trough naturally flows to the edge and then drops squarely into the lower one.

Each trough 14 has leading from it on its inner side a duct 16, into which is screwed a bent pipe 17, which serves as a mercury gage and cock, as when the bend is turned up, as shown on the two upper wheels in Fig. 1, it prevents the mercury from flowing out unless the trough is too full; but when the pipe is turned down, as shown on the lower wheel in Fig. 1, the mercury may be withdrawn.

The upper end of the standard 10 is reduced, as shown at 18, and supports a spreader-plate 19, which is circular and has its edge curved downward, as shown at $19^a$, so that the material dropped on the plate will pass off and fall squarely into the upper trough 14, and the top of the plate terminates at the center in a cone 20, which enters the snout 21 of a funnel or hopper 22. This hopper delivers on the cone, and consequently the material is spread by the cone over the entire surface of the spreader-plate 19, and is thus delivered to all parts of the upper trough 14.

The hopper 22 is adjustable up and down in the guide 23, which is formed, preferably, of a casting, and the hopper is held at any desired height by a set-screw 24, which projects through the guide and impinges on the snout of the hopper. By adjusting the hopper up or down the feed may be made faster or slower, as desired, as the space is varied between the lower end of the snout and the surface of the feed-cone 20. The guide 23 and the hopper 24 are supported by curved legs 25, which are bolted to the guide and extend downward outside the wheels 12, $12^a$, and $12^b$ to the ground, thus forming a substantial stand.

In using the apparatus the troughs 14 are filled with mercury and the gold-containing sand or other material is fed into the hopper 22 in any convenient way, and the hopper is supplied with sufficient water to cause the material to flow freely, while the cone 20 separates and distributes the mass so that it falls suently over the edge of the spreader-plate 19 and squarely into the trough 14 of the wheel 12, where the greater part of the gold is retained by the quicksilver, while the tailings flow over the edge of the trough and drop into the next trough below, which recovers more of the gold, and the tailings are then washed off to the next trough, and, if necessary, other troughs may be provided, a sufficient number of them being used to catch and save all the gold. As the troughs are relatively narrow, the sand is easily washed off the quicksilver, thus leaving a clean surface on which the gold may strike and be amalgamated, and it will be readily seen that the distance between the troughs may be regulated so that the sand will not drop far into the quicksilver, and thus it is more readily washed away.

Having thus described my invention, I claim as new and desire to secure by Letters Patent—

1. In a separator and amalgamator, the combination of a screw-threaded standard and a series of wheels having threaded hubs fitting said standard and having troughs of progressively increasing diameters adapted to deliver into one another from the top to the bottom of the series, and means for supplying the upper trough, substantially as set forth.

2. A separator and amalgamator, comprising a screw standard mounted on a suitable base, a series of wheels having their hubs threaded to fit the standards and at their outer peripheries troughs arranged to deliver from one into the other, a spreader plate mounted on the top of the standard to deliver into the upper trough, the plate having a conical top, and a feed hopper delivering on the top of the cone, substantially as described.

FRANK L. FISHER.

Witnesses:
CHARLES F. OTTAWAY,
LINDFRED T. SKINNER.